July 9, 1929.  C. E. BAKER  1,720,161
FLUID CONTROL TRANSMISSION
Filed June 17, 1925   5 Sheets-Sheet 2

Inventor
Charles E. Baker,
by Arthur B. Jenkins,
Attorney

July 9, 1929.  C. E. BAKER  1,720,161
FLUID CONTROL TRANSMISSION
Filed June 17, 1925    5 Sheets-Sheet 3
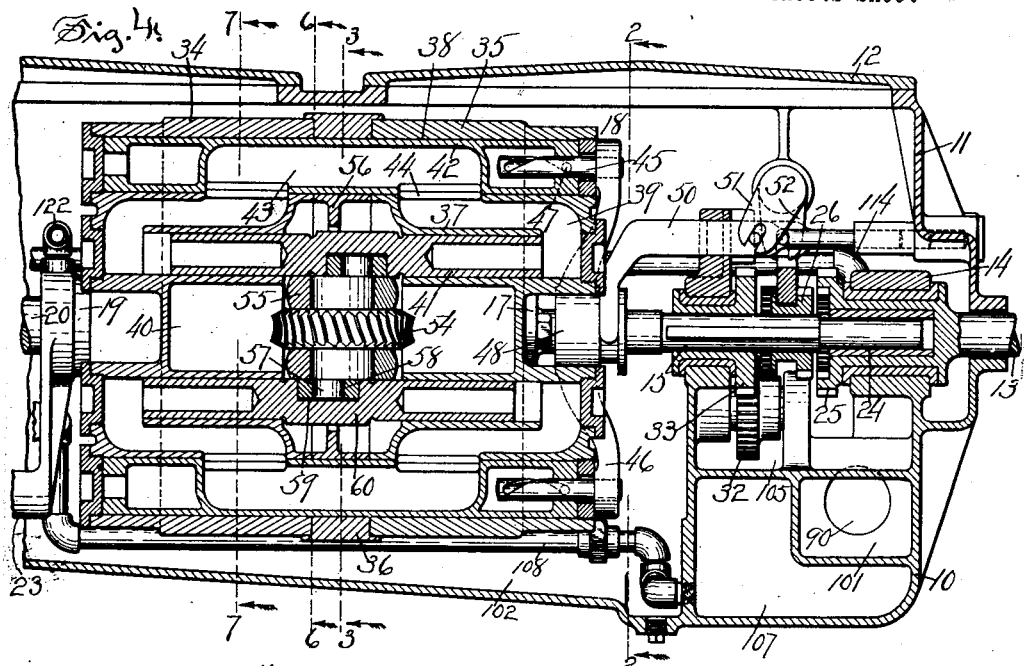
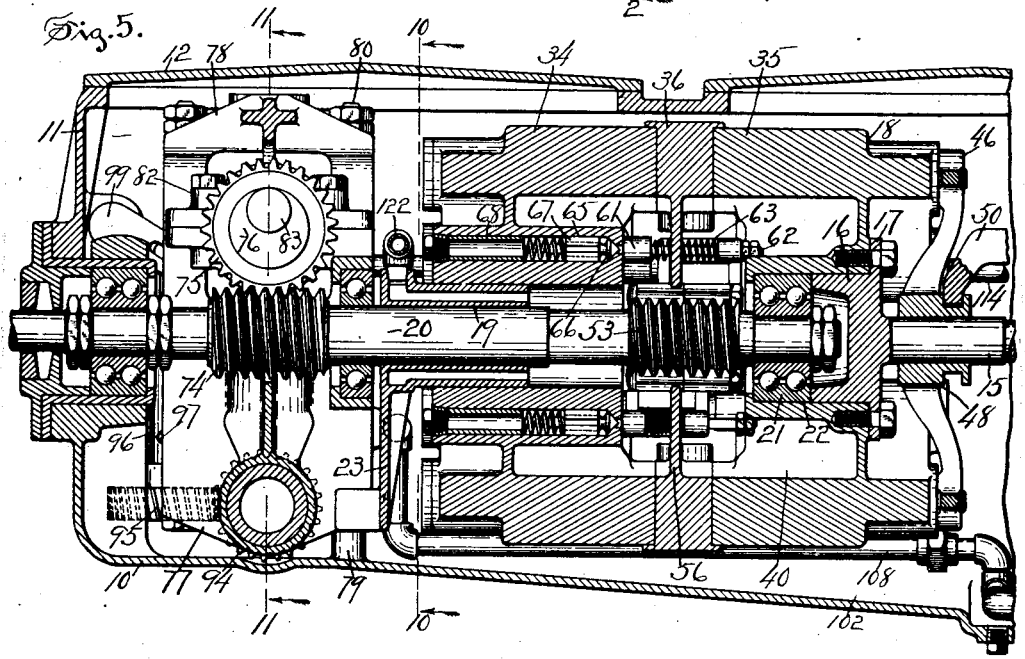
Inventor
Charles E. Baker
by
Arthur Jenkins,
Attorney July 9, 1929.  C. E. BAKER  1,720,161
FLUID CONTROL TRANSMISSION
Filed June 17, 1925    5 Sheets-Sheet 4
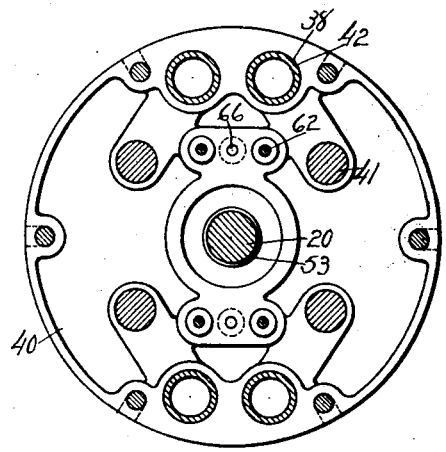
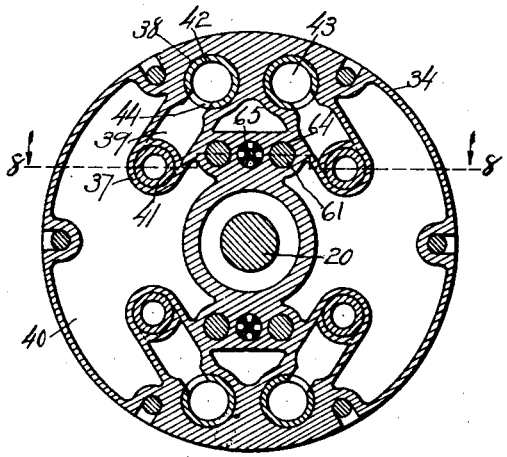
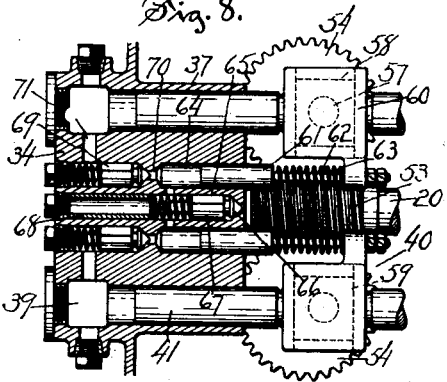
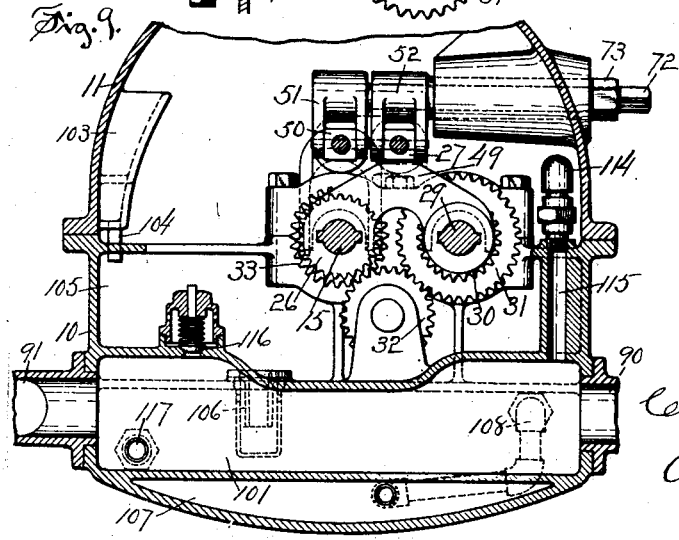
Inventor
Charles E. Baker,
by
Arthur B. Jenkins,
Attorney

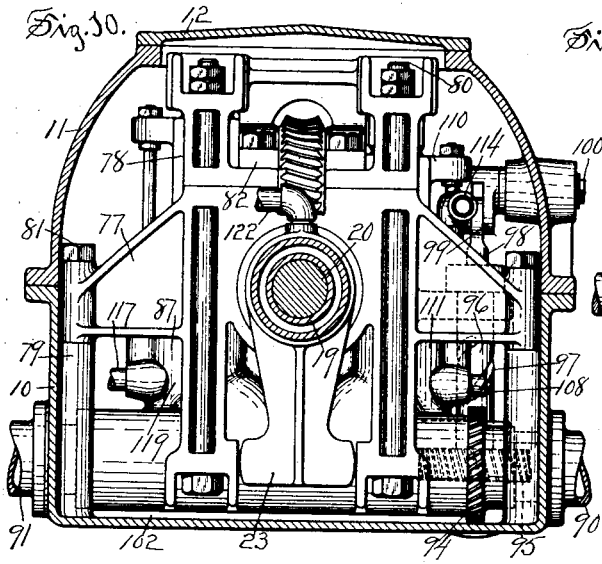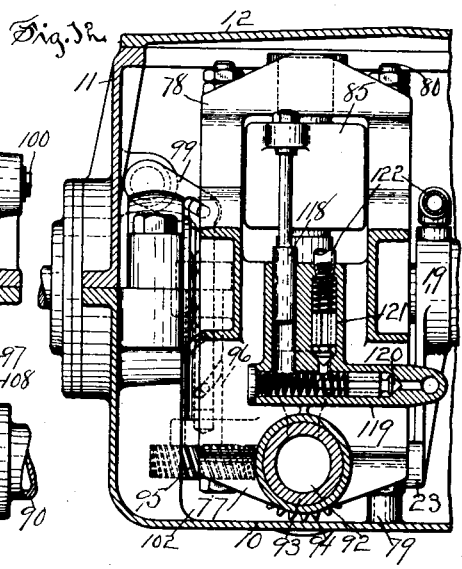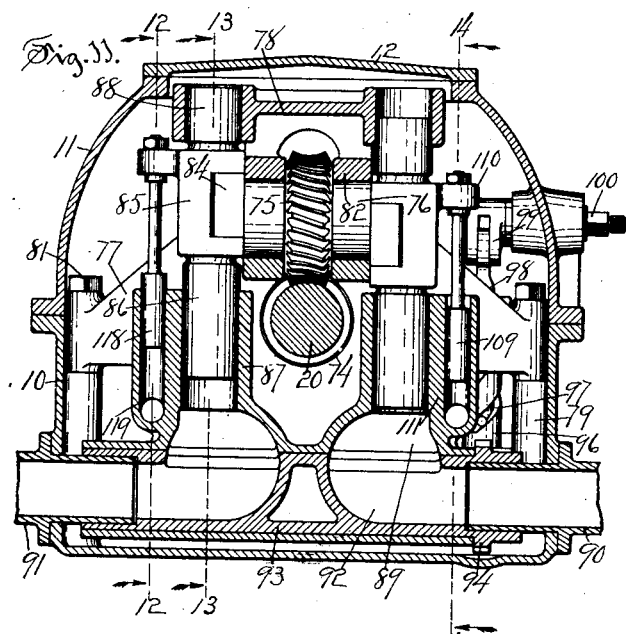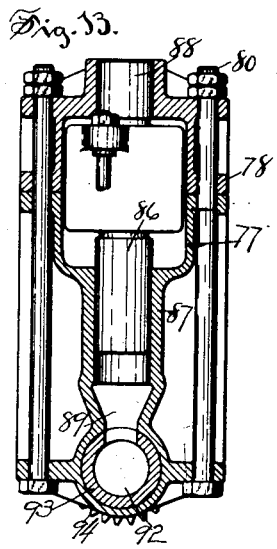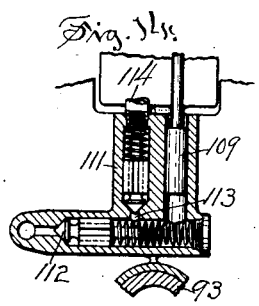

Patented July 9, 1929.

1,720,161

UNITED STATES PATENT OFFICE.

CHARLES E. BAKER, OF EAST HARTFORD, CONNECTICUT, ASSIGNOR OF ONE-HALF TO EDWIN W. PUTNAM, OF HARTFORD, CONNECTICUT.

FLUID-CONTROL TRANSMISSION.

Application filed June 17, 1925. Serial No. 37,833.

My invention relates to the class of devices employed for the variable transmission of power from one mechanism or device to another, and an object of my invention, among others, is the production of a device of this kind that shall be simple in construction and particularly efficient in operation.

One form of mechanism embodying my invention and in the construction and use of which the objects herein set out, as well as others, may be attained, is illustrated in the accompanying drawings, in which—

Figure 4 is a view in section on a plane denoted by the dotted line 4—4 of Figure 2, the gear reversing mechanism however, being shown in central section.

Figure 5 is a view in central section on a plane denoted by the dotted lines 5—5 of Figures 1 and 2.

Figure 6 is a view in section on a plane denoted by the dotted line 6—6 of Figure 4.

Figure 7 is a similar view on a plane denoted by the dotted line 7—7 of Figure 4.

Figure 8 is a view in section on a plane denoted by the dotted line 8—8 of Figure 7.

Figure 9 is a view on a plane denoted by the dotted line 9—9 of Figure 1, parts beyond being omitted.

Figure 10 is a view in cross section on a plane denoted by the dotted line 10—10 of Figure 1.

Figure 11 is a similar view on a plane denoted by the dotted line 11—11 of Figure 5.

Figure 12 is a view in cross section on a plane denoted by the dotted line 12—12 of Figure 11.

Figure 13 is a view in section on a plane denoted by the dotted line 13—13 of Figure 11.

Figure 14 is a view in partial section on a plane denoted by the dotted line 14—14 of Figure 11.

Figure 1:
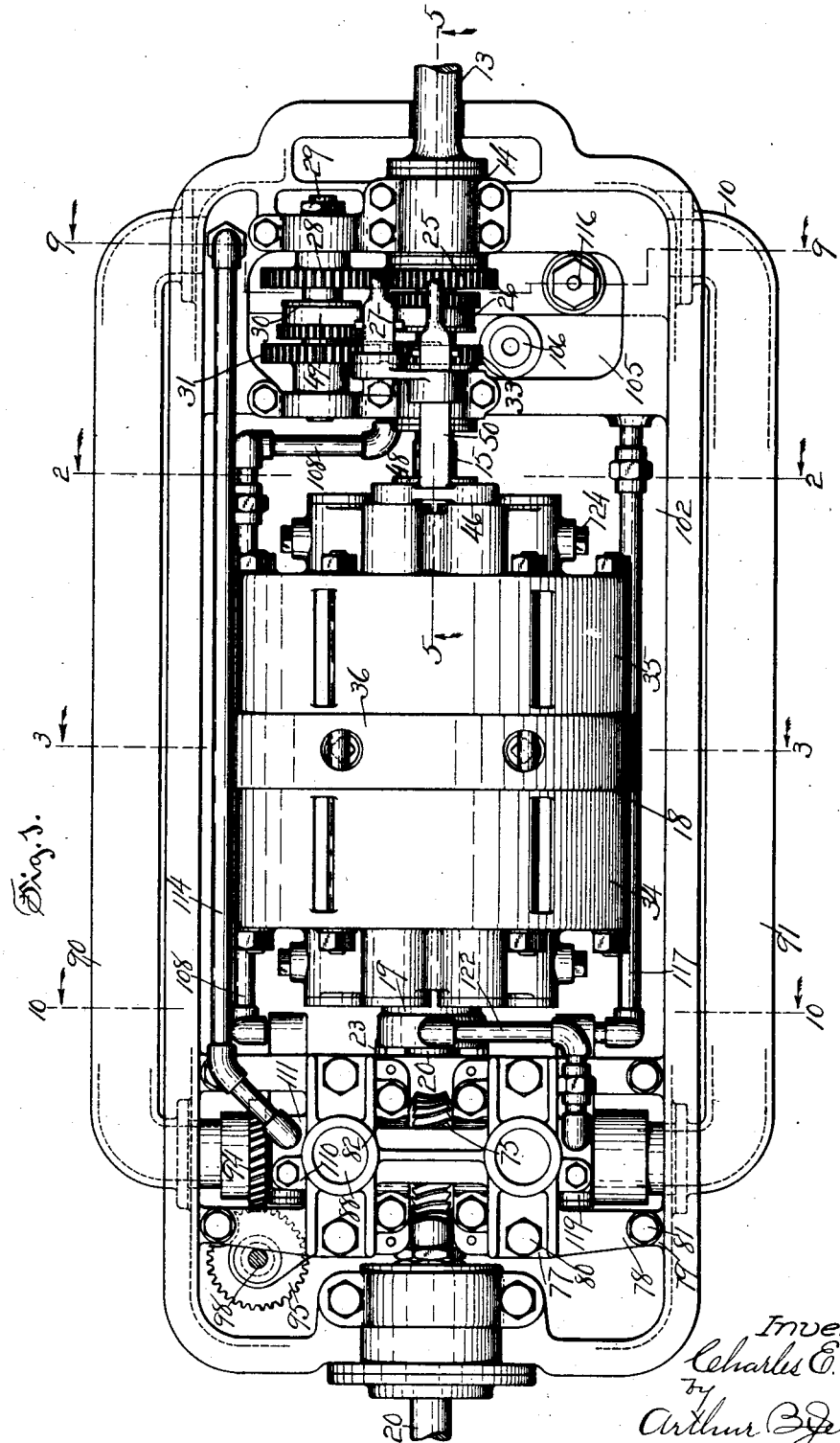
Figure 1 is a top view of my improved transmission mechanism, the upper section of the casing being removed thereby requiring the breaking off of certain parts.

It has heretofore been proposed to employ fluid, especially in the form of liquid, as a connecting medium for controlling the transmission of power from one mechanism or device to another, but there have been serious objections to the use of such devices owing to overheating by reason of excessive friction from the flow of fluid, this overheating practically eliminating such structures as operative mechanisms. In the construction of my improved mechanism I have so arranged the parts as to reduce this friction to a minimum and to such extent that overheating does not take place, such a structure being shown in the drawings herein in which the numeral 10 denotes the lower section of a transmission casing, 11 the upper section thereof and 12 covers for closing openings in the top of the upper section, said sections being secured together and the caps being attached in any suitable manner, as by means of screws or other desired fastening devices. The rear end of the driving or main shaft 13 is supported in a bearing 14 of any suitable construction comprising a part of the casing, this end of the shaft 13 having a recess to receive the front end of a transmission shaft 15 that is located in a bushing in said recess. The shaft 15 terminates at its rear end in a head 16 having a flange 17 by means of which said shaft is rigidly connected with a controller housing 18 rotatably mounted in the transmission case, the front end of said housing being therefore supported by the shaft 15 rotatably mounted in the rear end of the shaft 13 and the rear end of said housing being supported in an oil supply sleeve 19 through which a connecting shaft 20 extends into the housing from the rear end thereof nearly to its opposite end where it is supported as by ball bearings 21 located in a recess 22 extending inwardly from the front end of the housing at its center, and as shown in Figure 5 of the drawings, the head 16 of the transmission shaft extending into said recess and said head being recessed to receive the extreme end of the shaft 20 and the nuts for holding the ball bearing in place thereon. A holding arm 23 extends from the sleeve 19 into engagement with parts to be hereinafter described and operates to hold such sleeve against rotation.

The front end of the transmission shaft 15 extends into a bushing in the recess in the shaft 13, as hereinbefore described, this end of the shaft 13 being enlarged to provide for said recess, and as shown in Figure 4 of the drawings, the bushing 24 fitting the wall of said recess. A direction driving gear 25 is secured to the rear end of the shaft 13, said gear having an external and an internal set of teeth. A direct driving clutch member 26 is mounted for longitudinal movement on the shaft 15 for imparting rotation thereto, said clutch member comprising a gear to mesh with the internal teeth of the gear 25. This clutch member 26 has an annular groove to receive the forks on one end of an actuating arm 49 projecting from an actuating slide 27 adapted for manual operation and to be more specifically hereinafter described.

The peripheral teeth of the gear 25 mesh with the teeth of a driven reversing gear 28 secured to a reversing shaft 29 rotatably mounted in the casing, said shaft having a reversing clutch member 30 longitudinally movable thereon but compelled to rotate therewith and with teeth meshing with internal gear teeth on an intermediate reversing gear 31 mounted for free rotation on the shaft 29, peripheral teeth on the gear 31 meshing with the teeth of a direction gear 32 rotatably mounted in the casing and with its teeth meshing with the teeth of a reversing gear 33 secured to the shaft 15. The clutch actuating slide 27 has two forked arms, the forks of each arm being engaged with one of the clutch members 26 or 30 to insure disengagement of each of said clutch members from its cooperating clutch member when the other clutch member is engaged with its cooperating clutch member.

From this description it will be seen that when the clutch member 26 is engaged with the gear 25 the shaft 15 will be driven directly by the shaft 13, the clutch member 30 being disengaged from its cooperating clutch member 31, at this time said clutch members each being at one end of its path of movement. If said clutch members be now shifted to the other extreme of their paths the shaft 29, which through the action of the gear 28 is continuously rotated, will be operatively connected with the reversing gear 31 from which, through the interposition of the gear 32, rotation will be imparted to the shaft 15 in a reverse direction, thereby imparting reversing movement to the housing 18.

This housing 18 is composed of two end parts 34 and 35, and an intermediate part 36. The end parts each have cylinders 37 each of which registers with a similar cylinder in the opposite part, said end parts having registering valve chambers 38, fluid chambers 39, and a central chamber 40. In the construction herein shown there are eight cylinders and four valve chambers located, a portion of each chamber in one of the parts 34 or 35 of the housing, and a fluid chamber 39 at each end of each cylinder, and as shown in Figure 8 of the drawings.

A piston 41 is located in each of the cylinders, as herein shown each piston structure comprising two pistons, one at each end of the structure, located in two registering cylinders. Similarly there are four valves 42, each of which is located in a chamber comprising two registering portions located one in each end of the housing. These valves are rotatable and each has a passage 43 registering at its opposite ends with ports 44 leading to the chambers 39, such ports being closed when the valve is rotated to one position and opened when the valve is rotated to another position, and as shown in Figure 7.

Each valve is rotated by means of a valve operating spindle 45 secured to a valve operating arm 46 and having a spiral groove to receive a pin 47 secured to the valve and projecting into said groove. There is an arm 46 for each of the valves, these arms projecting in pairs in opposite directions from a valve actuating head 48 slidably mounted upon the shaft 15. The head 48 has an annular groove to receive the forked end of a speed controller slide 50 mounted in the case and actuated as by means of a speed controller actuator 51 rotatably mounted in bearings in the upper section 11 of the main casing, and as shown in Figure 4 of the drawings, said lever being adapted for manual operation as by a foot or hand in a manner that will be readily understood and for which reason further description and illustration are omitted herein. This lever 51 is operated by a rock shaft to which said lever is secured, said shaft having its axis coincident with the axis of a shaft for a clutch operating lever 52, said shafts being mounted one within the other. The lever 52 is engaged with the clutch actuating slide 27 hereinbefore described, said lever being employed to reciprocate said slide. The shafts of the levers 51 and 52 at their ends opposite said levers are suitably formed, as shown in Figure 9, to receive the connecting means for operating them.

Figure 3:
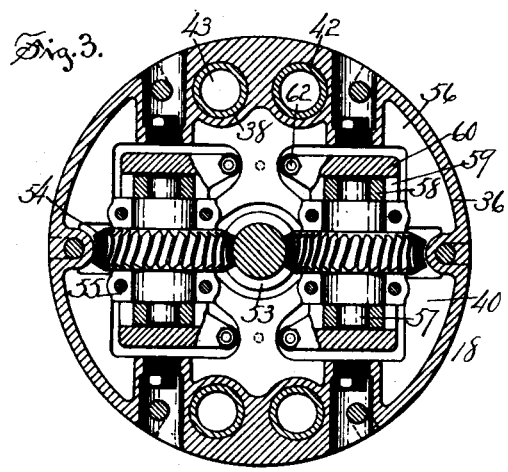
Figure 3 is a view in cross section through the controller housing only on a plane denoted by the dotted lines 3—3 of Figures 1 and 4.

The connecting shaft 20 has a piston actuating worm 53 engaged on opposite sides thereof with worm wheels 54 each of which has on its opposite sides hubs mounted in bearings 55 formed integral with a web 56 extending across and comprising a portion of the intermediate part 36 of the housing and as shown in Figure 3 of the drawings. Piston operating pins 57 projecting from eccentric positions at the ends of the hubs of the worm wheels, and as shown in Figure 4, project into slide blocks 58 in crosswise grooves 59 in piston heads 60. In the structure herein shown there are four of these piston heads located one on each side of each of the worm wheels 54 and the pistons 41 hereinbefore referred to project from these heads in opposite directions, there being two pistons to each head. A plump plunger 61 is operatively connected with each piston head 60, as by means of a rod 62 secured to a lug on said head and having a spring 63 thrusting against said lug and plunger. The plungers 61 are located in pump barrels 64 communicating by ports with an oil intake chamber 65, each of which chambers is common to two pump barrels, as shown in Figure 8. A valve 66, that is spring pressed to its seat and that opens by suction of the two pumps common thereto, has a grooved guide 67 secured thereto and fitting the chamber 65, a spring for seating the valve thrusting against said guide and against a tube 68, the end of the chamber opposite said valve being closed by a plug, as shown in Figure 8.

The chambers in the pump barrels 64 communicate at their ends through valve controlled ports 70 with supply chambers 69, the valves in which are similar to the valves 66 just described, and the chambers 69 being closed by plugs, as hereinbefore mentioned. These chambers 69 communicate by ports 71 with one of the fluid chambers 39 at one end of each pair of pistons common to a single piston head.

From the above description it will be noted that when the parts of the transmission mechanism are in the positions shown in Figure 1 the shaft 13 will be disconnected from the driving mechanism, and the parts, in automobile vernacular, will be in "neutral". If the slide 27 be now manually pushed forward as by operation of the shaft 73, thereby engaging the gear of the clutch member 26 with the internal teeth of the direction driving gear 25, direct rotation will be imparted to the controller housing from the crank shaft 13 through the medium of the transmission shaft 15, and said housing will be rotated thereby, revolving the worm wheels 54 around the worm 53. This will cause said worm wheels to be rotated and the pistons 41 will be reciprocated, but movement will not be imparted to other members for the reason that the valves 42 being open the liquid within the housing 18 will be freely shifted back and forth from one end of the housing to the opposite end thereof. If the speed controller slide 50 be now moved forward from the position shown in Figure 4, as by manual operation of the rock shaft 72, the valve operating arms 46 with the pins 47 will be moved forward, thereby gradually closing the valves 42 and impeding the shifting flow of the liquid. This presents an obstruction to the movement of the pistons 41, thereby creating a force that is transmitted to the worm 53, and the latter therefore gradually begins to rotate and drive the shaft 20 and the greater the obstruction to the movement of the pistons the faster will be the rotation of the shaft 20 until such time as the valves 42 are fully closed, when the housing will be rigidly connected with the shaft 20 and the latter will, therefore, be driven through a rigid connection with the main shaft 13.

A brake mechanism of a construction and operated in a manner similar to the driving mechanism is connected with the latter and forms an integral part thereof. The shaft 20 has a second and brake worm 74 located back of the driving worm 53 and meshing with a brake worm wheel 75 having hubs 76 mounted in bearings in a brake casing comprising in the construction herein shown two sections 77—78 the former being secured at its opposite corners to lugs 79 (four in number) formed on the inner wall of the lower section 10 of the main casing, and the section 78 being secured to the lower section 77 as by means of tie bolts 80, as shown in Figures 1, 10 and 13. Said section 77 is secured to the lugs 79 as by means of bolts 81, and caps 82 comprise the upper portions of the bearings in which the hubs 76 are located.

Eccentric pins 83 project from each of the hubs 76 into grooves in slide blocks 84 mounted for reciprocating movement in cross heads 85 supporting pump pistons 86 located in pump cylinders 87 formed in the section 77 of the brake casing, and as shown in Figures 11 and 13. The mechanism embodying the cylinders 87, the pistons and parts for operating them, and also operated thereby, is similar to that hereinbefore described with respect to the driving mechanism and a less detailed description will therefore be required for an understanding of its construction and operation. Guides 88 project from each of the cross heads 85 into openings in the section 78 of the brake casing, and as shown in Figures 1, 11 and 13 of the drawings, and the cylinders 87 both open into chambers 89 communicating with circulating pipes 90 and 91 through fluid ways 92 in a regulating valve 93 mounted for oscillating movement in the casing section 77 and operated by means of a spiral gear 94 on said valve meshing with a spiral gear 95 having an upright hollow shaft 96 mounted in bearings in the casing section 77 and also having oppositely disposed spiral grooves 97 that receive pins projecting from a longitudinally reciprocating shaft 98 pivotally attached at its end to an operating arm 99 projecting from a brake operating shaft 100 mounted in a bearing in the upper section 11 of the main casing, and as shown in Figures 10, 11 and 12 of the drawing. This shaft is suitably formed at its end for connection with an operating link or other device arranged for manual operation in a manner that will be readily understood and as hereinbefore described with respect to the driving mechanism.

The valve 93 is mounted in a bearing in the lower part of the brake casing section 77 and extends through said section from side to side, the ends of the pipes 90 and 91 entering the ends of said valve. Said pipes 90 and 91 pass out through the wall of the lower section 10 of the main section, at the rear end thereof, and, in the construction herein shown extend along opposite sides of said section to a point near its front end at which they enter said section from its opposite sides, communicating with a brake inlet chamber 101, this location of said pipes on the outside of said casing serving as a means for cooling the liquid therein.

By the operation of the pistons 86 the liquid, as oil, is caused to flow back and forth in the pipes 90 and 91 and chamber 101, but owing to the small amount of movement of the pistons the distance traveled by the liquid at any point is very short, thus reducing friction to a minimum, and this flow is obstructed by a closing movement of the valve 93, usually manually, in a manner as hereinbefore described with respect to the valves 42, and the more the valve is closed the greater will be the obstruction to the movement of the liquid and hence to that of the pistons 86, and through the connecting mechanism described finally to the shaft 20, thereby impeding the movement of the vehicle equipped with the mechanism to a degree depending upon the amount of closing movement imparted to the valve 93.

In an apparatus of this kind it is of great importance that the various parts shall be well supplied at all times with the oil or other liquid employed therein, so that the supply of such liquid shall always be maintained at a maximum, and to this end I provide a circulating system that fully accomplishes this purpose. This includes a main reservoir 102 that is comprised in the bottom of the lower section 10 of the main casing and into which reservoir oil is introduced to maintain the supply throughout the system, when said supply is reduced for any reason attending the operation of the mechanism. The oil in the main reservoir is kept at such height that the lower part of the housing comprising the parts 34, 35 and 36 is always located in it, and as a consequence the oil is thrown outwardly by centrifugal force into all parts of the main casing, and especially into a supply trough 103 that slopes downwardly toward the front end of the casing where it is delivered by a pipe 104 into a receiving reservoir 105 that opens through a cap 106 and openings thereto and therein, as shown in dotted lines in Figure 9, into a supply chamber 107 located in the bottom of the front part of the section 10 of the main casing, and as shown in Figures 4 and 9 of the drawings.

From the supply chamber 107 the oil is drawn by a pump through a pipe 108, said pump comprising a piston 109 connected with a lug 110 on one of the cross heads 85 (see Figure 11). The liquid is drawn by said piston in its outward movement into a chamber in a pump casing 111, outflow into the pipe 108 being prevented by a valve 112 as the piston moves inwardly. When the piston moves inwardly, however, the liquid drawn into the casing is forced outwardly through a valve controlled port 113 into a pipe 114 and through said pipe and a passage 115 into the inlet chamber 101. This affords a constant supply of liquid to the chamber comprising the brake mechanism and including pipes 90 and 91 and the chamber 101. When the pressure of the oil or liquid thus supplied to the chamber 101 increases beyond a desired point a spring closed relief valve 116 is opened allowing the excess liquid to escape into the lubricating reservoir 105.

The controller housing 18 is supplied with oil from the inlet chamber 101, such housing, therefore, receiving the liquid that has been cooled by the action of the pipes 90 and 91. Said liquid is conducted from the chamber 101 by a pipe 117 to a pump comprising a piston 118 located in a pump casing 119, the action of said pump drawing the liquid through the pipe 117 from the chamber 101 as the piston moves outward and a valve 120 preventing return flow of the liquid into the pipe 117 on the reverse or inward stroke of the piston. On this reverse or inward stroke the liquid that has been drawn into the casing 119 is forced through the valve controlled chamber 121 into a pipe 122 by which it is conducted into the sleeve 19 and thence into the central chamber 40 in the controller housing 18. From this chamber 40 the liquid is pumped, as hereinbefore described, by the action of the pump plungers 61 into the fluid chambers 39, so long as said chambers will take the liquid. When said chambers are filled, the springs 63 will yield thereby permitting movement of the piston heads 60 without operation of the pump plungers 61, but as soon as the amount of liquid is reduced to any extent within the chambers 39 the action of the pumps will be such as to replenish it.

Figure 2:
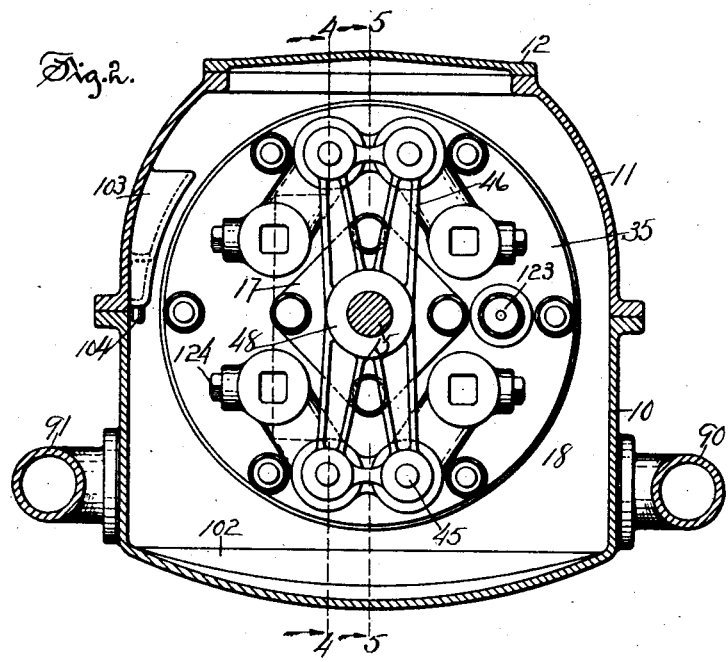
Figure 2 is a view in cross section on a plane denoted by the dotted lines 2—2 of Figures 1 and 4, some of the circulating pipes and parts beyond being omitted.

The chamber 40 is kept constantly filled with liquid by the action of the pump, including the piston 118, and any excess liquid will flow out through a spring pressed relief valve 123 (see Figure 2) similar in construction and operation to the valve 116, the excess liquid thus flowing from the chamber 40 into the main reservoir 102.

By keeping the chamber 40 filled with liquid that has been cooled in the manner hereinbefore described, a cooling medium is provided that is in substantial contact with the cylinders 37, and this presence of such cooling medium tends to reduce any abnormal temperatures that may otherwise be created by the shifting liquid within the cylinders.

Bleeder cups 124 are provided for the openings leading from the chambers 39, such openings being made use of to permit escape of air when the several chambers are being initially filled with liquid, thus insuring that all spaces in the mechanism shall be suitably filled with the liquid and thereby preventing the presence of any air pockets within the structure.

While the structure herein shown is especially adapted for use in automobile construction it is equally well adapted for use in connection with any mechanism in which it is desired to vary the speed of one mechanism with reference to that of another mechanism by which it may be driven. It is also observed that the structure is not limited to the number of cylinders, pistons, &c., illustrated and described but that the invention will be present in structures embodying such different numbers of cylinders, pistons, &c., as will specifically answer the demands required for any such specific structure.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A liquid clutch mechanism including a housing closed to the outflow of liquid therefrom, means for constantly supplying liquid to said housing to maintain a predetermined amount therein, a pair of cylinders enclosed within said housing and opening to communicating fluid chambers separately formed therein, pistons located within said cylinders, each of said pistons being movable to take up the amount of liquid displaced by another, means for operating said pistons, a valve to control flow of liquid from one of said chambers to another, means for operating said valve, means adapted to be connected with said housing to rotate it, and means connected with said housing to be operated thereby.

2. A liquid clutch mechanism including a housing closed to the outflow of liquid therefrom, means for constantly supplying liquid to said housing to maintain a predetermined amount therein, a pair of cylinders enclosed within said housing and opening to communicating fluid chambers separately formed therein, pistons located within said cylinders, said piston being rigidly connected and oppositely arranged, each being movable to take up the amount of liquid displaced by the other, means for operating said pistons, a valve to control flow of liquid from one of said chambers to another, means for operating said valve, means adapted to be connected with said housing to rotate it and means connected with said housing to be operated thereby.

3. A liquid clutch mechanism including a housing closed to the outflow of liquid therefrom, means for constantly supplying liquid to said housing to maintain a predetermined amount therein, a plurality of pairs of cylinders located within said housing and opening to communicating fluid chambers therein, pistons located in said cylinders, each of the pistons of each pair being movable to take up the amount of liquid displaced by the other piston of said pair, means for operating said pistons, a valve to control flow of liquid from one of said chambers to another appurtenant to each pair of pistons, means located outside of the housing for simultaneously operating said valves, means adapted to be connected with said housing to rotate it and means connected with said housing to be operated thereby.

4. A liquid clutch mechanism including a housing closed to the outflow of liquid therefrom, said housing having a central chamber, means for maintaining a supply of liquid within said chamber, a pair of cylinders enclosed within said housing and opening to communicating fluid chambers therein, pistons located in said cylinders, each of said pistons being movable to take up the amount of liquid displaced by the other, means for forcing liquid into said fluid chambers, means for operating said pistons, a valve to control flow of liquid from one of said communicating chambers to another, means for operating said valve, means adapted to be connected with said housing to rotate it and means connected with said housing to be operated thereby.

5. A liquid clutch mechanism including a housing closed to the outflow of liquid therefrom, said housing having a central chamber, means for maintaining a supply of liquid within said chamber, a plurality of pairs of cylinders enclosed within said housing and opening to communicating fluid chambers therein, pistons located in said cylinders, each of said pistons being movable to take up the amount of liquid displaced by another piston of the same pair, means for operating said pistons, a valve to control flow of liquid from one of said fluid chambers to another appurtenant to a single pair of cylinders, means for simultaneously operating all of said valves, means for forcing liquid into a plurality of said fluid chambers, means adapted to be connected with said housing to rotate it and means connected with said housing to be operated thereby.

6. A liquid clutch mechanism including a housing closed to the outflow of liquid therefrom, means for maintaining a supply of liquid within the housing, a pair of cylinders enclosed within said housing and opening to communicating fluid chambers therein, pistons located within said cylinders, each of said pistons being movable to take up the amount of liquid displaced by the other, means within said housing and including a worm member for simultaneously operating said pistons, a valve to control flow of liquid from one of said chambers to another, means for operating said valve, means for rotating said housing and means connected with said worm member to be operated thereby.

7. A liquid clutch mechanism including a housing closed to the outflow of liquid therefrom, said housing having a central chamber, means for maintaining a supply of liquid within said chamber, a pair of cylinders enclosed within said housing and opening to communicating fluid chambers therein, pistons located within said cylinders, means including a worm member located within said central chamber and operatively connected with said pistons to simultaneously operate them, means for forcing liquid from said central chamber into said fluid chambers, means for rotating said housing, and means operatively connected with said worm member to be operated thereby.

8. A liquid clutch mechanism including a housing closed to the outflow of liquid therefrom, said housing having a central chamber, means for maintaining a supply of liquid within said chamber, a pair of cylinders enclosed within said housing and opening to communicating fluid chambers therein, pistons located within said cylinders, each of said pistons being movable to take up the amount of liquid displaced by the other, a piston head to which said pistons are rigidly attached, means for operating said head to reciprocate said pistons, means connected with said head to force liquid from said central chamber into said fluid chambers, means for rotating said housing and means adapted to be connected with said housing to be operated thereby.

9. A liquid clutch mechanism including a main casing for containing a supply of liquid, a housing rotatably mounted in said casing and closed to the outflow of liquid from within said housing, means for maintaining a supply of liquid within said housing, means for taking a supply of liquid from said casing to maintain the supply within said housing, a pair of cylinders enclosed within said housing and opening to communicating fluid chambers therein, pistons located within said cylinders, each of said pistons being movable to take up the amount of liquid displaced by the other, means for operating said pistons, a valve to control flow of liquid from one of said chambers to another, means for operating said valve, means connected with said housing to rotate it, and means adapted to be connected with said housing to be operated thereby.

10. A liquid clutch mechanism, including a main casing for containing a supply of liquid, a housing rotatably mounted in said casing and closed to the outflow of liquid therefrom, said housing having a central chamber, means for maintaining within said chamber a supply of liquid taken from said casing, a pair of cylinders enclosed within said housing and opening to communicating fluid chambers therein, pistons located within said cylinders, each of said pistons being movable to take up the amount of liquid displaced by the other, means for operating said pistons, a valve to control flow of liquid from one of said chambers to another, means for forcing liquid from said central chamber into said fluid chambers, means connected with said housing to rotate it, and means adapted to be connected with said housing to be operated thereby.

11. A liquid clutch mechanism including a housing closed to the outflow of liquid therefrom, a chamber within which liquid is circulated, means for cooling said liquid, means for supplying liquid from said chamber to a chamber within said housing, a pair of cylinders enclosed within said housing and opening to communicating fluid chambers therein, pistons located within said cylinders, each of said pistons being movable to take up the amount of liquid displaced by the other, means for operating said pistons, a valve to control flow of liquid from one of said chambers to another, means for operating said valve, means connected with said housing to rotate it, and means adapted to be connected with said housing to be operated thereby.

12. A liquid clutch mechanism including a housing closed to the outflow of liquid therefrom, a brake mechanism embodying a pump including pistons for causing movement of said liquid with a liquid passageway between said pistons, a pump operatively connected with said pistons and for maintaining a supply of liquid taken from said brake mechanism and forced into said housing, a pair of cylinders enclosed within said housing and opening to communicating fluid chambers therein, pistons located within said cylinders, each of said pistons being movable to take up the amount of liquid displaced by the other, means for operating said pistons, a valve to control flow of liquid from one of said chambers to another, means for operating said valve, means connected with said housing to rotate it, and means adapted to be connected with said housing to be operated thereby.

13. A liquid clutch mechanism including a housing closed to the outflow of liquid therefrom, a brake mechanism embodying a pump including cylinders with pipes for circulation of liquid, pistons located within said cylinders to circulate liquid through said pipes and a pump operatively connected with said pistons to supply liquid taken from said circulating pipes and supply it within said housing, a pair of cylinders enclosed within said housing and opening to fluid chambers therein, pistons located within said cylinders, each of said pistons being movable to take up the amount of liquid displaced by the other, means for operating said pistons, a valve to control flow of liquid from one of said chambers to another, means for operating said valve, means connected with said housing to rotate it, and means adapted to be connected with said housing to be operated thereby.

14. A liquid clutch mechanism including a casing, a housing rotatably mounted in said casing and closed to the outflow of liquid therefrom, a reservoir within said casing, a brake mechanism embodying a pump, cylinders communicating with a passageway in pipes for circulation of liquid, pistons located within said cylinders, means connected with said pistons to operate them and a pump connected with said piston operated means to take liquid from said reservoir and supply it to said circulating pipes, means connected with said brake pistons for maintaining a supply of liquid taken from said circulating pipes and within said housing, a pair of cylinders enclosed within said housing and opening to communicating fluid chambers therein, pistons located within said cylinders, each of said pistons being movable to take up the amount of liquid displaced by the other, means for operating said pistons, a valve to control flow of liquid from one of said chambers to another, and means for operating said valve.

15. A liquid clutch mechanism including a casing having a main reservoir and a receiving reservoir therein, circulating pipes for conducting liquid from said main reservoir to said receiving reservoir, a brake mechanism embodying a pump including cylinders with pistons for causing movement of said liquid therein and a liquid passageway extending between said cylinders and means for operating said pistons, a pump connected with said pistons to supply liquid from said receiving reservoir to said circulating pipes, a pump connected with said pistons to supply liquid taken from said circulating pipes to maintain the supply within said housing, means for permitting escape of excess liquid from said circulating pipes into said receiving reservoir, a pair of cylinders enclosed within said housing and opening to fluid chambers therein, pistons located within said cylinders, each of said pistons being movable to take up the amount of liquid displaced by the other, means for operating said pistons, a valve to control flow of liquid from one of said chambers to another, means for operating said valve, means connected with said housing to rotate it and means adapted to be connected with said housing to be operated thereby.

16. A liquid clutch mechanism including a casing comprising a reservoir for liquid, a housing rotatably mounted in said casing, means for maintaining a supply of liquid within the housing from the quantity within the casing, a pair of cylinders inclosed within said housing and opening to communicating fluid chambers separately formed therein, pistons in said cylinders each adapted to take up the amount of liquid displaced by another, means for operating the pistons, a valve rotatably mounted in said housing to control flow of said liquid, means for operating the valve, means connected with said housing to operate it, and means adapted to be connected with said housing to be operated thereby.

CHARLES E. BAKER.